(12) United States Patent
Dalmatov et al.

(10) Patent No.: US 10,929,066 B1
(45) Date of Patent: Feb. 23, 2021

(54) USER STREAM AWARE FILE SYSTEMS WITH USER STREAM DETECTION

(71) Applicant: EMC IP Holding Company LLC, Hopkinton, MA (US)

(72) Inventors: Nickolay Alexandrovich Dalmatov, Saint Petersburg (RU); Richard P. Ruef, Santa Cruz, CA (US); Kurt W. Everson, Richmond, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/526,391

(22) Filed: Jul. 30, 2019

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,060,713 B1 | 11/2011 | Natanzon |
| 8,396,839 B1 * | 3/2013 | Huang ................ G06F 16/1748 707/664 |
| 9,317,377 B1 * | 4/2016 | Wu ..................... G06F 11/1469 |
| 9,454,318 B2 | 9/2016 | Zhu et al. |
| 9,594,513 B1 | 3/2017 | Delgado et al. |
| 10,120,875 B1 | 11/2018 | Duggal et al. |
| 10,289,566 B1 | 5/2019 | Dalmatov et al. |
| 10,303,797 B1 | 5/2019 | Menezes et al. |
| 10,305,954 B1 | 5/2019 | Faibish et al. |
| 10,402,091 B1 | 9/2019 | Vankamamidi et al. |
| 10,459,648 B1 * | 10/2019 | Menezes ............. G06F 11/1453 |

* cited by examiner

*Primary Examiner* — Sean D Rossiter
(74) *Attorney, Agent, or Firm* — BainwoodHuang

(57) ABSTRACT

Techniques for handling multiple data streams in stream-aware data storage systems. The data storage systems can detect multiple sub-streams in an incoming stream of data, form a group of data blocks corresponding to each respective sub-stream, and associate, bind, and/or assign a stream ID to each data block in the respective sub-stream. The data storage systems can write each group of data blocks having the same stream ID to the same segment of a data log in one or more non-volatile storage devices, and manage and/or maintain, in persistent data storage, attribute information pertaining to the groups of data blocks in the respective sub-streams relative to time periods during which the respective groups of data blocks were written and/or received. The techniques can improve the detection of multiple sub-streams in an incoming stream of data, and improve the management of attribute information pertaining to data blocks in the respective sub-streams.

18 Claims, 5 Drawing Sheets

USER STREAM AWARE FILE SYSTEMS WITH USER STREAM DETECTION

BACKGROUND

Data storage systems include storage processing circuitry coupled to arrays of non-volatile storage devices, such as, for example, solid state drives (SSDs), hard disk drives (HDDs), optical drives, and so on. The storage processing circuitry is configured to service host-generated storage input/output (JO) requests, which specify data blocks, data files, data pages, and/or other data elements to be written to, read from, created on, and/or deleted from the respective non-volatile storage devices. Such storage processing circuitry is further configured to execute software programs for managing the storage JO requests (e.g., write requests, read requests), and for performing various processing tasks to organize and/or secure the data blocks, data files, data pages, and/or other data elements on the respective non-volatile storage devices.

SUMMARY

Solid state drives (e.g., flash-based SSDs) can be configured to support multi-streaming capabilities, which allow the placement of data within the flash-based SSDs to be controlled to reduce write amplification, as well as minimize the processing overhead of garbage collection activities performed within the flash-based SSDs. To implement such multi-streaming capabilities, storage processing circuitry can be configured to service host-generated write requests, each of which can include a tag (also referred to herein as a "stream identifier" or "stream ID") added to the write request. The storage processing circuitry can group or associate a data element (e.g., a data block) specified by the write request with one or more other data blocks having the same stream ID. The storage processing circuitry can also direct an SSD to place the data block in the same storage segment as the other data block(s) in the group. For example, each such data block in the group can have at least one common attribute relating to, for example, temporal locality, spatial locality, stream ID, logical block address (LBA), data type, port number, and so on.

Unfortunately, there are shortcomings to implementing multi-streaming capabilities in data storage systems. For example, in such data storage systems, information pertaining to groups of data blocks written to SSDs (e.g., various attributes of data blocks in the respective groups) is often not well managed and/or maintained. As a result, locality information (e.g., temporal locality, spatial locality), stream IDs, LBAs, data types, and/or other attribute information for the respective data blocks can be lost or otherwise made unavailable, particularly after garbage collection activities are performed within the SSDs. In addition, incoming streams of data received at the data storage systems can sometimes include multiple separate sub-streams originating from different users and/or applications. However, in such data storage systems, multiple sub-streams in an incoming stream of data are often not well detected and/or identified. Even if such sub-streams were well detected/identified by the data storage systems, less than optimal management and/or maintenance of attribute information pertaining to groups of data blocks in the respective sub-streams can lead to undesirable comingling of data blocks from different sub-streams.

Techniques are disclosed herein for handling multiple data streams in stream-aware data storage systems. The disclosed techniques can be employed in data storage systems to improve the detection and/or identification of multiple sub-streams in an incoming stream of data, as well as improve the management and/or maintenance of attribute information pertaining to groups of data blocks in the respective sub-streams. Such a stream-aware data storage system can include storage processing circuitry configured to service host-generated storage IO requests (e.g., write requests, read requests), which can direct the data storage system to write and/or read data blocks, data files, data pages, and/or other data elements to/from file systems, logical units (LUNs), and/or any other suitable storage objects. The stream-aware data storage system can further include a file system that has a log-based architecture design, and can employ one or more SSDs (e.g., flash-based SSDs) that provide log-based data storage, which can include a data log divided into a series of storage segments of equal or varying size.

In the stream-aware data storage system, the storage processing circuitry can service a plurality of host-generated write requests specifying a plurality of data blocks, respectively, in an incoming stream of data. The storage processing circuitry can detect and/or identify one or more separate sub-streams in the incoming stream of data based on at least one attribute of the data. For example, if the incoming stream of data includes an incoming stream of data blocks, then the storage processing circuitry can detect and/or identify the respective sub-streams based on certain attribute information such as the temporal locality of the data blocks, the spatial locality of the data blocks, a stream ID associated with each data block, an LBA associated with the data blocks, the type of each data block, the port number through which each data block is received, the host computer that generated the storage JO request, and so on, or any suitable combination thereof. Having detected and/or identified the separate sub-streams of data blocks, the storage processing circuitry can form a group of data blocks corresponding to each respective sub-stream, and associate, bind, and/or assign a stream ID to each data block in the respective sub-stream. The storage processing circuitry can then write each group of data blocks having the same stream ID to the same segment of the data log included in the SSD(s). In addition, the storage processing circuitry can manage and/or maintain, in persistent data storage, the attribute information pertaining to the groups of data blocks in the respective sub-streams relative to time periods during which the respective groups of data blocks were written, received, and/or created.

In certain embodiments, a method of handling multiple data streams in a stream-aware data storage system includes identifying one or more data sub-streams in an incoming data stream based on at least one attribute of data elements in the respective data sub-streams, forming one or more groups of data elements from the respective data sub-streams, and writing one or more groups of data elements as log structured data to one or more segments of a data log.

In certain arrangements, the method includes identifying one or more data sub-streams in the incoming data stream based on one or more of a temporal locality of the data elements, a spatial locality of the data elements, a type of each data element, and a port number through which each data element is received.

In certain arrangements, the method includes associating a stream identifier (ID) to each data element in each data sub-stream.

In certain arrangements, the method includes writing each group of data elements having the same stream ID to the same segment of the data log.

In certain arrangements, the method includes maintaining, in persistent data storage, information pertaining to at least one attribute of the data elements in the respective data sub-streams relative to time periods during which the respective groups of data elements were written.

In certain arrangements, the method includes generating a digest for each data element in each respective data sub-stream, thereby generating a plurality of digests for a plurality of data elements, respectively, in the respective data sub-stream.

In certain arrangements, the method includes forming a group of digests from the plurality of digests, and associating a stream identifier (ID) to each digest in the group of digests.

In certain arrangements, the method includes writing the group of digests as a data stream of log structured data to a segment of the data log.

In certain arrangements, the method includes maintaining, in persistent data storage, information pertaining to (i) at least one attribute of the data elements in the respective data sub-stream, and (ii) the respective digests in the data stream, relative to a time period during which each of a respective group of data elements from the respective data sub-stream and the group of digests from the data stream were written to the data log.

In certain embodiments, a data storage system includes a memory, and processing circuitry configured to execute program instructions out of the memory to identify one or more data sub-streams in an incoming data stream based on at least one attribute of data elements in the respective data sub-streams, form one or more groups of data elements from the respective data sub-streams, and write one or more groups of data elements as log structured data to one or more segments of a data log.

In certain arrangements, the processing circuitry is configured to execute the program instructions out of the memory to identify one or more data sub-streams in the incoming data stream based on one or more of a temporal locality of the data elements, a spatial locality of the data elements, a type of each data element, and a port number through which each data element is received.

In certain arrangements, the processing circuitry is configured to execute the program instructions out of the memory to associate a stream identifier (ID) to each data element in each data sub-stream.

In certain arrangements, the processing circuitry is configured to execute the program instructions out of the memory to write each group of data elements having the same stream ID to the same segment of the data log.

In certain arrangements, the processing circuitry is configured to execute the program instructions out of the memory to maintain, in persistent data storage, information pertaining to at least one attribute of the data elements in the respective data sub-streams relative to time periods during which the respective groups of data elements were written.

In certain arrangements, the processing circuitry is configured to execute the program instructions out of the memory to generate a digest for each data element in each respective data sub-stream, thereby generating a plurality of digests for a plurality of data elements, respectively, in the respective data sub-stream.

In certain arrangements, the processing circuitry is configured to execute the progam instructions out of the memory to form a group of digests from the plurality of digests, and associate a stream identifier (ID) to each digest in the group of digests.

In certain arrangements, the processing circuitry is configured to execute the program instructions out of the memory to write the group of digests as a data stream of log structured data to a segment of the data log.

In certain arrangements, the processing circuitry is configured to execute the program instructions out of the memory to maintain, in persistent data storage, information pertaining to (i) at least one attribute of the data elements in the respective data sub-stream, and (ii) the respective digests in the data stream, relative to a time period during which each of a respective group of data elements from the respective data sub-stream and the group of digests from the data stream were written to the data log.

In certain embodiments, a computer program product includes a set of non-transitory, computer-readable media having instructions that, when executed by control circuitry of a computerized apparatus, cause the control circuitry to perform a method of handling multiple data streams in a stream-aware data storage system. The method includes identifying one or more data sub-streams in an incoming data stream based on at least one attribute of data elements in the respective data sub-streams, forming one or more groups of data elements from the respective data sub-streams, and writing one or more groups of data elements as log structured data to one or more segments of a data log.

In certain arrangements, the method includes generating a digest for each data element in each respective data sub-stream in order to generate a plurality of digests for a plurality of data elements, respectively, in the respective data sub-stream, forming a group of digests from the plurality of digests, associating a stream identifier (ID) to each digest in the group of digests, and writing the group of digests as a data stream of log structured data to a segment of the data log.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for handling multiple data streams in stream-aware data storage systems. The data storage systems can detect and/or identify multiple sub-streams in an incoming stream of data, form a group of data elements (e.g., data blocks) corresponding to each respective sub-stream, and associate, bind, and/or assign a stream identifier (ID) to each data block in the respective sub-stream. The data storage systems can write each group of data blocks having the same stream ID to the same segment of a data log included in one or more non-volatile storage devices (e.g., solid state drives (SSDs)), and manage and/or maintain, in persistent data storage, attribute information pertaining to the groups of data blocks in the respective sub-streams relative to time periods during which the respective groups of data blocks were written, received, and/or created. The disclosed techniques can be employed in data storage systems to improve the detection and/or identification of multiple sub-streams in an incoming stream of data, as well as improve the management and/or maintenance of attribute information pertaining to groups of data blocks in the respective sub-streams.

Figure 1:
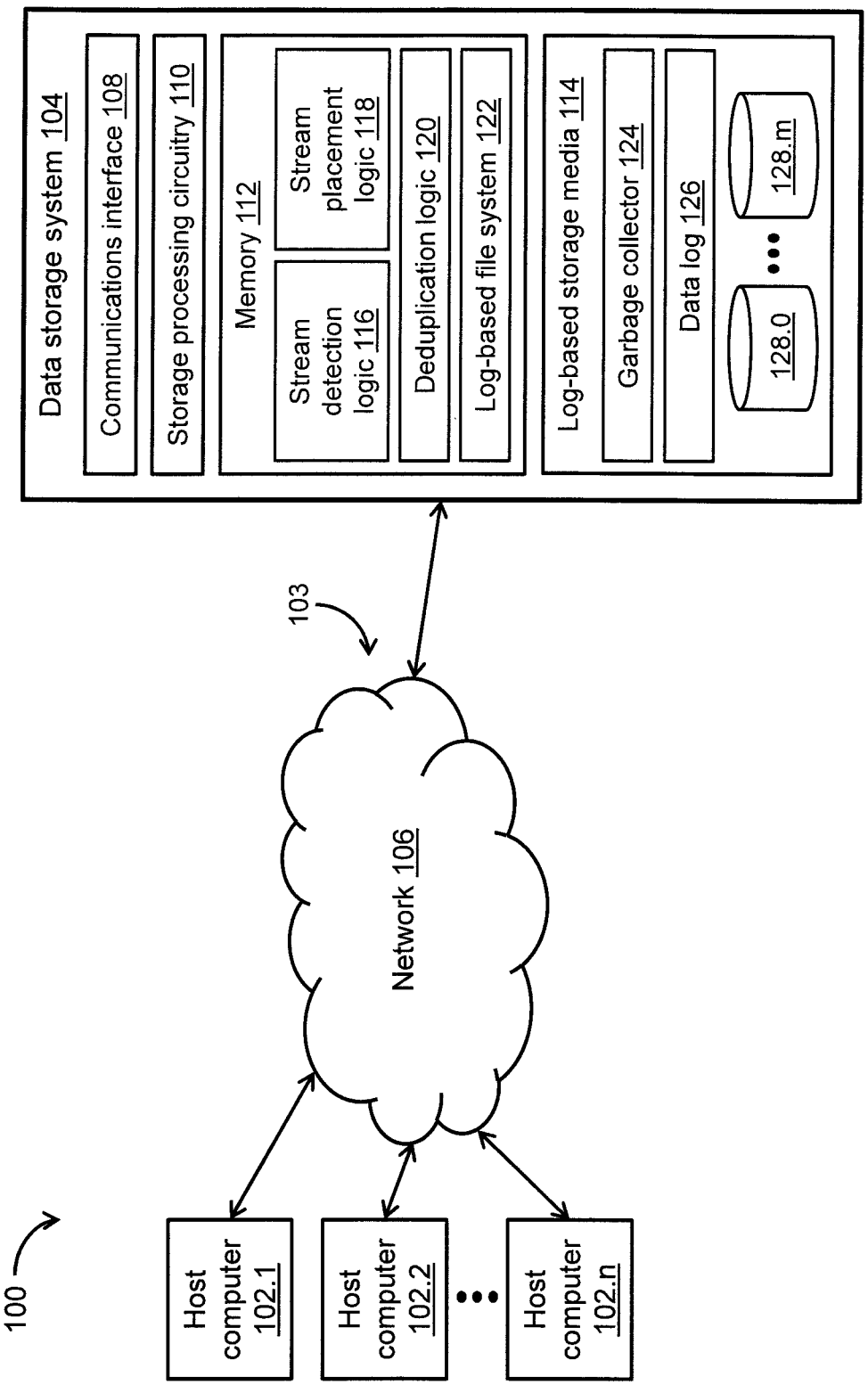
FIG. 1 is a block diagram of an exemplary storage environment, in which techniques can be practiced for handling multiple sub-streams in an incoming stream of data in a stream-aware data storage system.

FIG. 1 depicts an illustrative embodiment of an exemplary storage environment 100, in which techniques can be practiced for handling multiple data streams in stream-aware data storage systems. As shown in FIG. 1, the storage environment 100 can include a plurality of host computers 102.1, 102.2, ..., 102.n, a data storage system 104, and a communications medium 103 that includes at least one network 106. For example, each of the plurality of host computers 102.1, ..., 102.n can be configured as a web server computer, a file server computer, an email server computer, an enterprise server computer, or any other suitable client or server computer or computerized device. The plurality of host computers 102.1, ..., 102.n can be further configured to provide, over the network 106, storage input/output (IO) requests (e.g., small computer system interface (SCSI) commands, network file system (NFS) commands) to the data storage system 104. For example, such storage JO requests (e.g., write requests, read requests) can direct the data storage system 104 to write and/or read data blocks, data files, data pages, and/or other data elements (also referred to herein as "host data") to/from file systems, logical units (LUNs), and/or any other suitable storage objects maintained in association with the data storage system 104.

The communications medium 103 can be configured to interconnect the plurality of host computers 102.1, ..., 102.n with the data storage system 104 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper based data communications devices and cabling, fiber optic based communications devices and cabling, wireless communications devices, and so on, or any suitable combination thereof. The communications medium 103 can be further configured to support storage area network (SAN) based communications, network attached storage (NAS) based communications, local area network (LAN) based communications, metropolitan area network (MAN) based communications, wide area network (WAN) based communications, wireless communications, distributed infrastructure communications, and/or any other suitable communications.

The data storage system 104 can include a communications interface 108, storage processing circuitry 110, a memory 112, and log-based storage media 114. The communications interface 108 can include SCSI target adapters, network interface adapters, and/or any other suitable adapters for converting electronic, optical, and/or wireless signals received over the network 106 to a form suitable for use by the storage processing circuitry 110. The memory 112 can include persistent memory (e.g., flash memory, magnetic memory) and non-persistent memory (e.g., dynamic random access memory (DRAM), static random access memory (SRAM)). Further, the memory 112 can accommodate specialized software constructs including stream detection logic 116, stream placement logic 118, deduplication logic 120, and a log-based file system 122. The log-based storage media 114 can accommodate specialized hardware constructs (e.g., processor or processing circuitry, memory) and/or software constructs including a garbage collector 124, a data log 126, and/or any other suitable hardware/software construct(s), as well as one or more non-volatile storage devices 128.0, ..., 128.m such as solid state drives (e.g., flash-based SSDs). The data log 126 can be implemented on one or more of the flash-based SSDs 128.0, ..., 128.m, and can be divided into a series of storage segments (or "windows," using CBFS® Storage terminology) of equal or varying size.

The stream detection logic 116 can be configured to detect and/or identify one or more separate sub-streams in an incoming data stream (e.g., an incoming data stream 202; see FIG. 2) based on at least one attribute of the data. For example, if the incoming data stream includes an incoming stream of data blocks, then the stream detection logic 116 can detect and/or identify the respective sub-streams based on certain attribute information such as the temporal locality of the data blocks, the spatial locality of the data blocks, a stream identifier (ID) associated with each data block, a logical block address (LBA) associated with the data blocks, the type of each data block (also referred to herein as the "block type") (e.g., ASCII data type, integer data type, pointer data type, image data type, multimedia data type, digest data type), the port number through which each data block is received, the host computer that generated the storage IO request, and so on, or any suitable combination thereof. As employed herein, the term "temporal locality" refers to a number of data block addresses referenced by storage IO requests per unit time. For example, if the temporal locality of references to a data block address is high, then it is likely that the data block at that address will be accessed again soon. Further, the term "spatial locality" refers to a number of data block addresses referenced by storage IO requests per unit address space. For example, if the spatial locality of references relative to a data block address is high, then it is likely that one or more other data block addresses close to that data block address will also be accessed.

The stream placement logic 118 can be configured to form a group of data blocks for each detected and/or identified sub-stream, to associate, bind, and/or assign a stream ID to each data block in the group, and to write the group of data blocks having the same stream ID to logical addresses of the log-based file system 122. The log-based file system 122 can translate the logical addresses to physical addresses of the log-based storage media 114, and write the group of data blocks to the respective physical addresses, which can correspond to the same segment of the data log 126. In this way, the placement of a data sub-stream in a storage segment of the data log 126 of the log-based storage media 114 can be accomplished.

The deduplication logic 120 can be configured to generate a digest for each data block (e.g., by applying a hash function to the data block) in each group of data blocks formed by the stream placement logic 118. Once digests for a respective group of data blocks have been generated, the stream placement logic 118 can group the digests, associate, bind, and/or assign a stream ID to each digest in the group, and write the group of digests having the same stream ID to the same segment of the data log 126. For each received data block corresponding to a detected and/or identified sub-stream, the deduplication logic 120 can generate a digest for the received data block, compare the generated digest with the respective grouped digests for that sub-stream, and determine whether there is a matching digest, possibly signifying multiple copies of the received data block. If an actual copy of the received data block is found (such as by a bit-by-bit comparison), the storage processing circuitry 110 can remove the received data block from the data storage system 104, and replace it with a reference to the copy of the data block stored on the log-based storage media 114, thereby saving storage space. In addition, the storage processing circuitry 110 can manage and/or maintain, in persistent data storage (e.g., in the memory 112 and/or on the log-based storage media 114), attribute information pertaining to the groups of data blocks in the respective sub-streams, as well as attribute information pertaining to their respective digests, relative to time periods during which the groups of data blocks/digests were written, received, created, and/or generated.

The storage processing circuitry 110 can include one or more physical storage processors or engines (running specialized software), data movers, director boards, blades, IO modules, storage drive controllers, switches, and/or any other suitable computer hardware or combination thereof. For example, the storage processing circuitry 110 can execute program instructions out of the memory 112, process storage IO requests (e.g., write requests, read requests) provided by the respective host computers 102.1, ..., 102.n, and store host data in any suitable storage environment (e.g., a redundant array of independent disks (RAID) environment) implemented by the flash-based SSDs 128.0, ..., 128.m.

In the context of the storage processing circuitry 110 being implemented using one or more processors running specialized software, a computer program product can be configured to deliver all or a portion of the specialized software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

During operation, the data log 126 included in the log-based storage media 114 can be divided into a series of storage segments of equal or varying size. A variety of techniques can be employed to partition the data log 126 into the series of storage segments based on, for example, logical addresses, physical addresses, RAID groups, RAID stripes, RAID extents, and/or storage device extents. In certain embodiments, the series of storage segments can be distributed across different storage tiers, such as a high speed tier of SSDs, a medium speed tier of serial attached SCSI (SAS) devices, a low speed tier of near-line SAS devices, and so on. Once a group of data blocks from a detected and/or identified sub-stream contains a full segment's worth of data, the stream placement logic 118 can associate, bind, and/or assign a stream ID to each data block in the group, and write the group of data blocks having the same stream ID to logical addresses of the log-based file system 122. The log-based file system 122 can, in turn, write the group of data blocks to physical addresses of the log-based storage media 114 that correspond to the same next adjacent or non-adjacent unoccupied (or available) segment of the data log 126.

In the event one or more data blocks in the group is modified, updated, overwritten, unmapped, or otherwise invalidated, the garbage collector 124 can perform garbage collection functions to reclaim storage space in the segment containing the group of data blocks, thereby reducing fragmentation. For example, such garbage collection functions can include combining or consolidating any remaining valid data blocks in the storage segment, copying the valid data blocks to unoccupied storage space in a next available segment of the data log 126, and/or erasing the data blocks in the segment to make its storage space available for reuse. Likewise, the garbage collector 124 can perform garbage collection functions to reclaim storage space in the segment containing the group of digests for the respective data blocks, due to one or more of the data blocks and their respective digests being concurrently invalidated. By controlling the placement of groups of data blocks and/or their respective digests in segments of the data log 126 based at least on the sub-stream/stream to which each group of data blocks/digests belongs, the processing overhead associated with performing such garbage collection functions can be significantly reduced.

The disclosed techniques for handling multiple data streams in stream-aware data storage systems will be further understood with reference to the following illustrative example, as well as FIGS. 1, 2, and 3a-3c. In this example, the data storage system 104 (see FIG. 1) services host-generated storage IO requests (e.g., write requests, read requests), which direct the data storage system 104 to write and/or read data blocks of the incoming data stream 202 (see FIG. 2) to/from logical addresses of the log-based file system 122.

Figure 2:
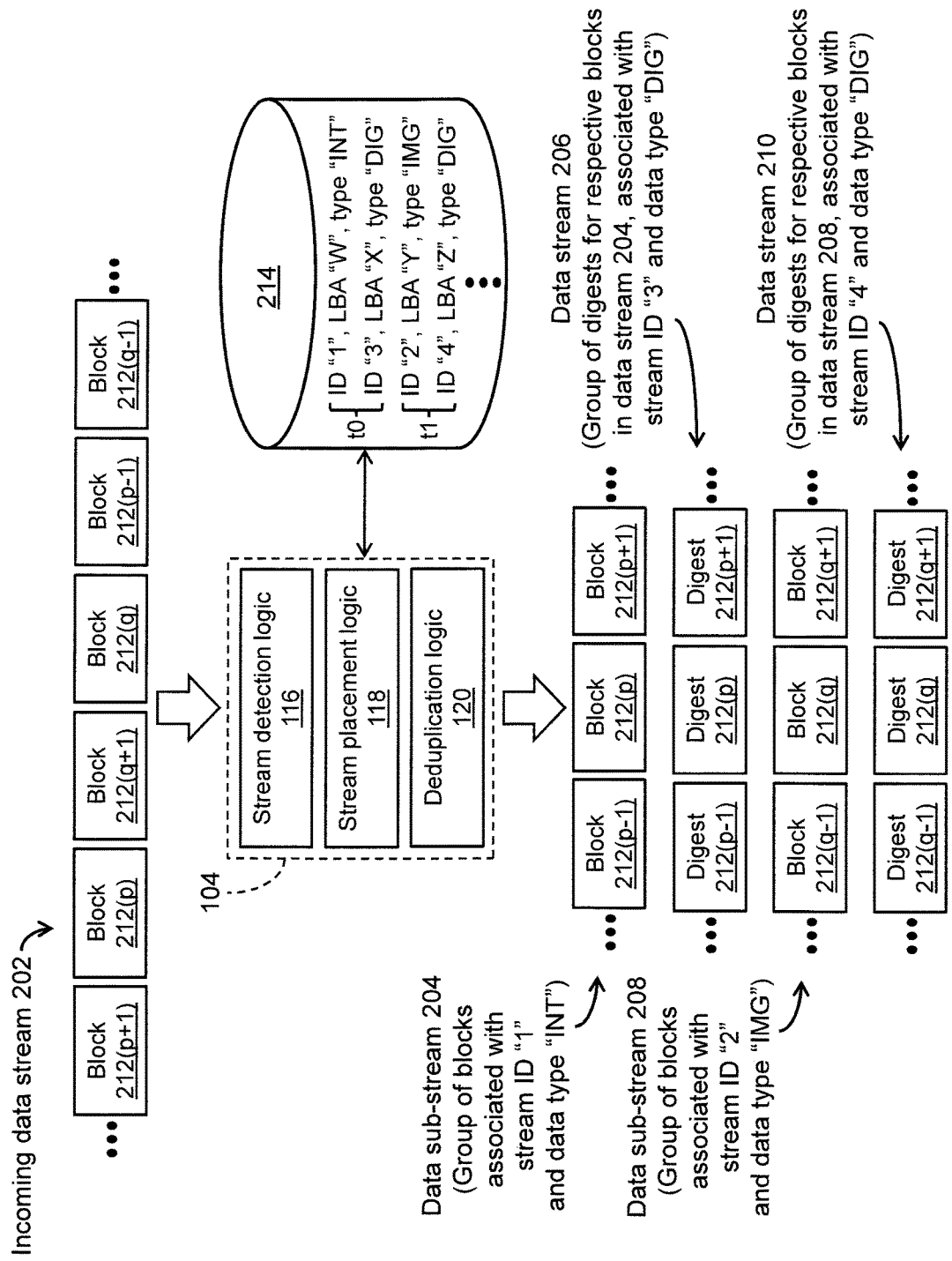
FIG. 2 is a block diagram of exemplary stream detection logic, exemplary deduplication logic, and exemplary stream placement logic included in the data storage system of FIG. 1, for use in forming, as one or more sub-streams and/or streams, one or more groups of data blocks and/or digests having similar attributes, as well as exemplary persistent data storage for use in managing and/or maintaining information pertaining to the attributes of the groups of data blocks/digests in the respective sub-streams/streams.

FIG. 2 depicts the incoming data stream 202, which includes, in the order of the storage IO requests, at least a block 212($p$+1), a block 212($p$), a block 212($q$+1), a block 212($q$), a block 212($p$−1), and a block 212($q$−1). As shown in FIG. 2, the incoming data stream 202 is operated on by the stream detection logic 116, which detects and/or identifies one or more separate sub-streams in the incoming data stream 202 based on at least one attribute of the data. In this example, the stream detection logic 116 detects the respective sub-streams based on certain attribute information such as the block type (e.g., ASCII data type, integer data type, pointer data type, image data type, multimedia data type, digest data type). For example, the stream detection logic 116 can inspect a header of each data block to detect or identify at least (i) a first sub-stream including the blocks 212(*p*−1), 212(*p*), 212(*p*+1), each of which has the block type, "integer" (INT), and (ii) a second sub-stream including the blocks 212(*q*−1), 212(*q*), 212(*q*+1), each of which has the block type, "image" (IMG).

Having detected the first sub-stream and the second sub-stream in the incoming data stream 202, the stream placement logic 118 forms a first group of data blocks (i.e., . . . block 212(*p*−1), block 212(*p*), block 212 (*p*+1) . . . ) corresponding to the first sub-stream, and a second group of data blocks (i.e., . . . block 212(*q*−1), block 212(*q*), block 212(*q*+1) . . . ) corresponding to the second sub-stream, and associates, binds, and/or assigns a stream ID to each data block in the respective groups of data blocks. In this example, the stream placement logic 118 associates the stream ID "1" to each data block in the first group of data blocks (i.e., . . . block 212(*p*−1), block 212(*p*), block 212(*p*+1) . . . ), and associates the stream ID "2" to each data block in the second group of data blocks (i.e., . . . block 212(*q*−1), block 212(*q*), block 212(*q*+1) . . . ). In this way, a data sub-stream 204 (see FIG. 2) is generated that includes the first group of data blocks having the stream ID "1" and block type "INT," and a data sub-stream 208 (see also FIG. 2) is generated that includes the second group of data blocks having the stream ID "2" and block type "IMG."

Having generated the data sub-stream 204 and the data sub-stream 208, the deduplication logic 120 generates a digest for each data block in the data sub-stream 204, and likewise generates a digest for each data block in the data sub-stream 208. Once the digests are generated for each data block in the respective sub-streams 204, 208, the stream placement logic 118 groups the digests for the data blocks in the data sub-stream 204, groups the digests for the data blocks in the data sub-stream 208, and associates, binds, and/or assigns a stream ID to each digest in the respective digest groupings. In this example, the stream placement logic 118 associates the stream ID "3" to each digest in the grouping corresponding to the data blocks in the data sub-stream 204, and associates the stream ID "4" to each digest in the grouping corresponding to the data blocks in the data sub-stream 208. The stream placement logic 118 also associates a data type, namely, "digest" (DIG), to the respective groupings of digests. In this way, a data stream 206 is generated that includes the grouping of digests having the stream ID "3" and data type "DIG," and a data stream 210 is generated that includes the grouping of digests having the stream ID "4" and data type "DIG."

The stream placement logic 118 (*i*) writes the data sub-stream 204 to the log-based file system 122 starting at logical block address (LBA) "W," (ii) writes the data stream 206 to the log-based file system 122 starting at LBA "X," (iii) writes the data sub-stream 208 to the log-based file system 122 starting at LBA "Y," and (iv) writes the data stream 210 to the log-based file system 122 starting at LBA "Z." The log-based file system 122 then (i) writes the data sub-stream 204 to a first segment of the data log 126 starting at a first physical address translated from the LBA "W," (ii) writes the data stream 206 to a second segment of the data log 126 starting at a second physical address translated from the LBA "X," (iii) writes the data sub-stream 208 to a third segment of the data log 126 starting at a third physical address translated from the LBA "Y," and (iv) writes the data stream 210 to a fourth segment of the data log 126 starting at a fourth physical address translated from the LBA "Z."

The storage processing circuitry 110 manages and/or maintains, in persistent data storage (e.g., in the memory 112 and/or on the log-based storage media 114), attribute information pertaining to the data sub-stream 204, the data stream 206, the data sub-stream 208, and the data stream 210 written to the first segment, the second segment, the third segment, and the fourth segment, respectively, of the data log 126. Such attribute information for the respective data sub-streams/streams 204, 206, 208, 210 is managed and/or maintained in a log 214 (see FIG. 2) relative to time periods during which the corresponding groups of data blocks/digests were written, received, created, and/or generated. In this example, the attribute information for the data sub-stream 204 (i.e., ID "1", LBA "W", type "INT"), as well as the attribute information for its corresponding group of digests in the data stream 206 (i.e., ID "3", LBA "X", type "DIG"), are managed relative to a time period "t0" during which the corresponding groups of data blocks/digests were received/generated. Further, the attribute information for the data sub-stream 208 (i.e., ID "2", LBA "Y", type "IMG"), as well as the attribute information for its corresponding group of digests in the data stream 210 (i.e., ID "4", LBA "Z", type "DIG"), are managed relative to a time period "t1" during which the corresponding groups of data blocks/digests were received/generated.

Figure 3A:
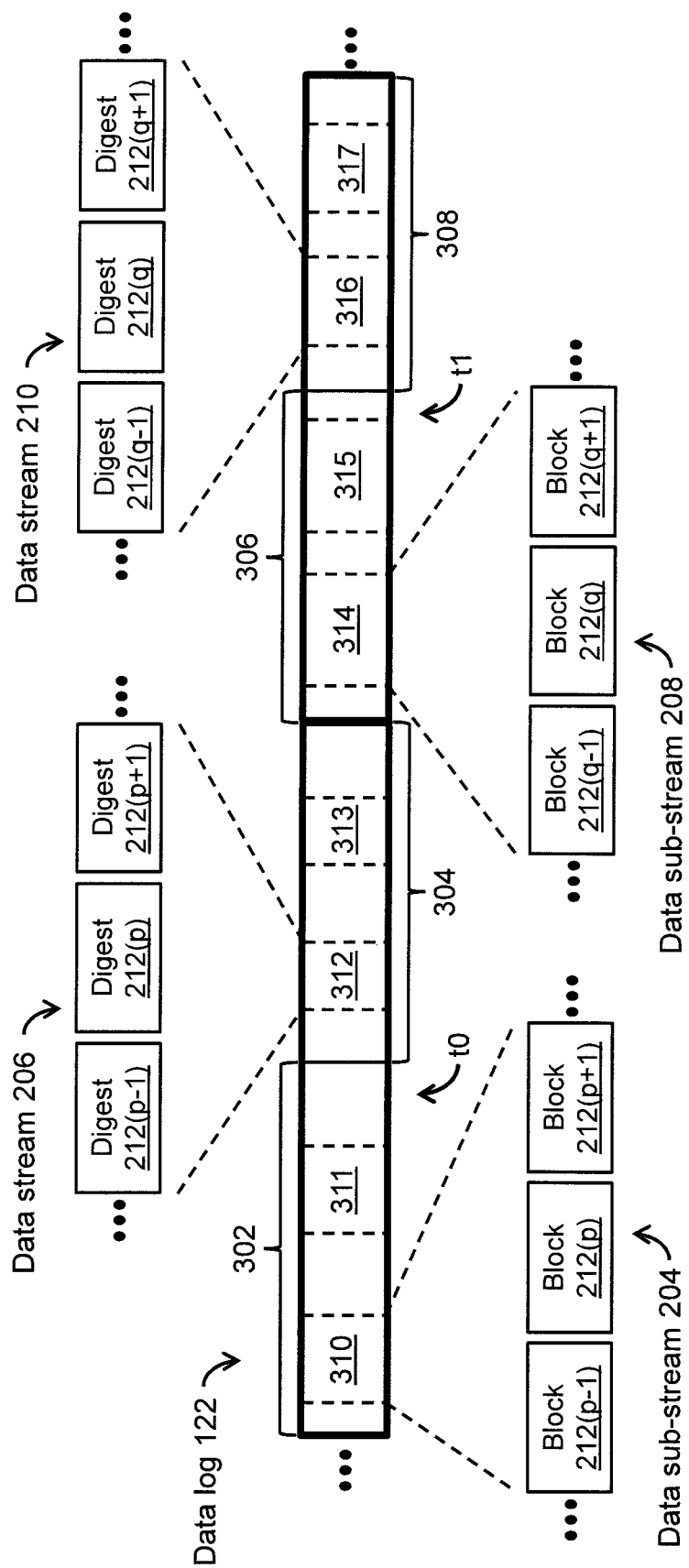
FIG. 3a is a block diagram of an exemplary data log included in log-based data storage associated with the data storage system of FIG. 1, illustrating the placement of the sub-streams/streams of FIG. 2 in respective segments of the data log.
Figure 3B:
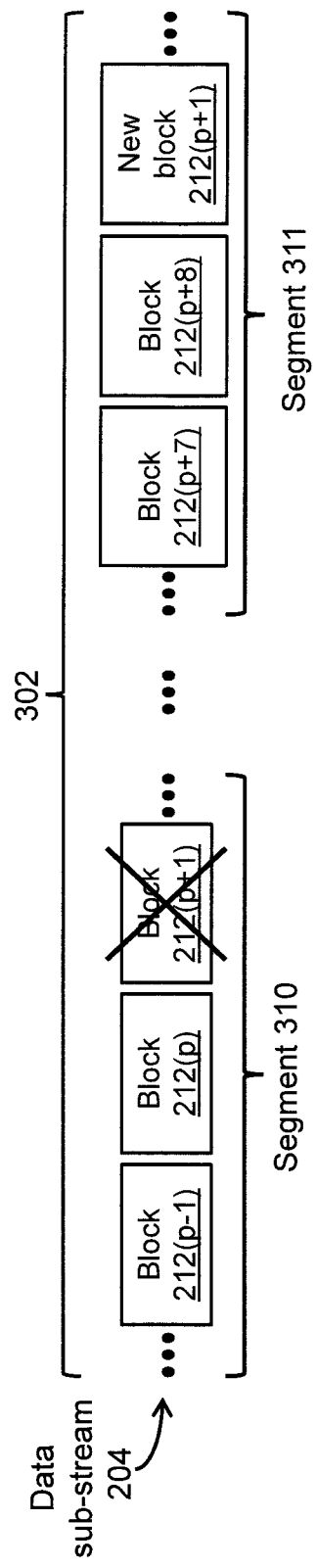
FIG. 3b is a block diagram illustrating an exemplary garbage collection function being performed on data blocks of one of the sub-streams of FIG. 2.
Figure 3C:
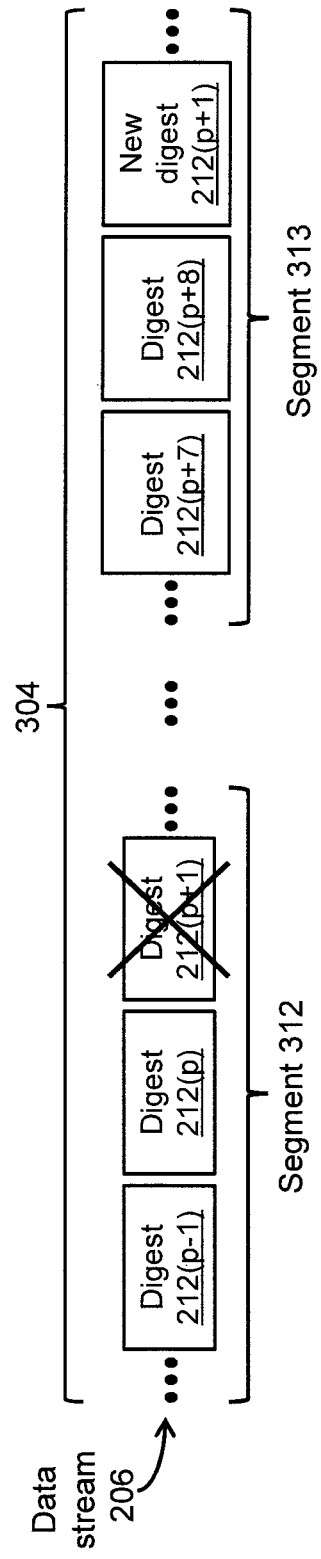
FIG. 3c is a block diagram illustrating an exemplary garbage collection function being performed on a stream of digests corresponding to the respective data blocks of FIG. 3b.

FIG. 3*a* depicts an exemplary embodiment of the data log 122, which is divided into a series of storage segments of equal or varying size, including at least a storage segment 310, a storage segment 311, a storage segment 312, a storage segment 313, a storage segment 314, a storage segment 315, a storage segment 316, and a storage segment 317. In this example, the data sub-stream 204 including the first group of blocks . . . 212(*p*−1), 212(*p*), 212(*p*+1) . . . is written to the segment 310, the data stream 206 including the group of digests . . . 212(*p*−1), 212(*p*), 212(*p*+1) . . . is written to the segment 312, the data sub-stream 208 including the second group of blocks . . . 212(*q*−1), 212(*q*), 212(*q*+1) . . . is written to the segment 314, and the data stream 210 including the group of digests . . . 212(*q*−1), 212(*q*), 212(*q*+1) . . . is written to the segment 316.

It is noted that any suitable number of storage segments 302 (including the storage segments 310, 311) can be used to store data blocks corresponding to the data sub-stream 204, and any suitable number of storage segments 304 (including the storage segments 312, 313) can be used to store digests corresponding to the data stream 206, such that the temporal order of the digests . . . 212(*p*−1), 212(*p*), 212(*p*+1) . . . in the storage segments 304 is maintained relative to the temporal order of the blocks . . . 212(*p*−1), 212(*p*), 212(*p*+1) . . . in the storage segments 302. Likewise, any suitable number of storage segments 306 (including the storage segments 314, 315) can be used to store data blocks corresponding to the data sub-stream 208, and any suitable number of storage segments 308 (including the storage segments 316, 317) can be used to store digests corresponding to the data stream 210, such that the temporal order of the digests . . . 212(*q*−1), 212(*q*), 212(*q*+1) . . . in the storage segments 306 is maintained relative to the temporal order of the blocks . . . 212(*q*−1), 212(*q*), 212(*q*+1) . . . in the storage segments 308. It is also noted that "t0" represents the time period during which the first group of blocks . . . 212(*p*−1), 212(*p*), 212(*p*+1) . . . was received and its corresponding group of digests . . . 212(*p*−1), 212(*p*), 212(*p*+1) . . . was generated. Further, "t1" represents the time period during which the second group of blocks . . . 212(*q*−1), 212(*q*), 212($q$+1) . . . was received and its corresponding group of digests . . . 212($q$−1), 212($q$), 212($q$+1) . . . was generated.

FIG. 3$b$ depicts a garbage collection function performed by the garbage collector 124 on the data sub-stream 204, which includes the first group of blocks . . . 212($p$−1), 212($p$), 212($p$+1) . . . written to the storage segment 310, as well as blocks . . . 212($p$+7), 212($p$+8) . . . written to the storage segment 311. In this example, the blocks . . . 212($p$−1), 212($p$), 212($p$+1), 212($p$+7), 212($p$+8) . . . (corresponding to the stream ID "1") each have the block type "INT." Further, at least the block 212($p$−1), the block 212($p$), and the block 212($p$+1) are sequentially written as log structured data to the storage segment 310, and at least the block 212($p$+7) and the block 212($p$+8) are sequentially written as log structured data to the storage segment 311. In addition, information is managed and/or maintained (e.g., in the memory 112 and/or the log-based storage media 114) in the log 214, including one or more attributes of the original blocks 212($p$−1), 212($p$), 212($p$+1), 212($p$+7), 212($p$+8) such as the block type "INT."

In this example, at least the original block 212($p$+1) included in the data sub-stream 204 is modified. Such modification of the original block 212($p$+1) is represented by a new block 212($p$+1), which is sequentially written as log structured data to the storage segment 311, such as after the block 212($p$+8). Once at least the new block 212($p$+1) is written to the storage segment 311, the garbage collector 124 can perform its garbage collection function, which includes invalidating at least the original block 212($p$+1) written to the storage segment 310 (as indicated by a cross "X" drawn through the block 212($p$+1); see FIG. 3$b$), combining or consolidating any remaining valid data blocks (such as the original blocks 212($p$−1), 212($p$)) as a group in the storage segment 310, copying the group of valid data blocks (including the original blocks 212($p$−1), 212($p$)) to a next unoccupied (or available) segment (not shown) among the storage segments 302, and erasing at least the original blocks 212($p$−1), 210($p$), 210($p$+1) from the storage segment 310 to make its storage space available for reuse. It is noted that information pertaining to one or more attributes of the copied data blocks (e.g., stream ID, LBA, block type) is managed and/or maintained in the log 214 relative to the time period during which the group of data blocks were copied, written, and/or created.

FIG. 3$c$ depicts a garbage collection function performed by the garbage collector 124 on the data stream 206, which includes the group of digests . . . 212($p$−1), 212($p$), 212($p$+1) written to the segment 312, as well as digests . . . 212($p$+7), 212($p$+8) . . . written to the storage segment 313. In this example, the digests 212($p$−1), 212($p$), 212($p$+1) are generated for the blocks 212($p$−1), 212($p$), 212($p$+1), respectively, and the digests 212($p$+7), 212($p$+8) are generated for the blocks 212($p$+7), 212($p$+8), respectively. The digests . . . 212($p$−1), 212($p$), 212($p$+1), 212($p$+7), 212($p$+8) . . . (corresponding to the stream ID "3") each have the data type "DIG." Further, at least the digest 212($p$−1), the digest 212($p$), and the digest 212($p$+1) are sequentially written as log structured data to the storage segment 312, and at least the digest 212($p$+7) and the digest 212($p$+8) are sequentially written as log structured data to the storage segment 313. In addition, information is managed and/or maintained (e.g., in the memory 112 and/or the log-based storage media 114) in the log 214, including one or more attributes of the original digests 212($p$−1), 212($p$), 212($p$+1), 212($p$+7), 212($p$+8) such as the data type "DIG."

As described herein, at least the original block 212($p$+1) included in the data sub-stream 204 was modified, and such modification of the original block 212($p$+1) was written as the new block 212($p$+1) to the storage segment 311. In this example, because the original block 212($p$+1) was modified, the original digest 212($p$+1) for the original block 212($p$+1) is effectively modified as a new digest 212($p$+1) for the new block 212($p$+1). The deduplication logic 120 generates the new digest 212($p$+1), which is sequentially written as log structured data to the storage segment 313, such as after the digest 212($p$+8). Once at least the new digest 212($p$+1) is generated and written to the storage segment 313, the garbage collector 124 can perform its garbage collection function, which includes invalidating at least the original digest 212($p$+1) written to the storage segment 312 (as indicated by a cross "X" drawn through the digest 212($p$+1); see FIG. 3$c$), combining or consolidating any remaining valid digests (such as the original digests 212($p$−1), 212($p$)) in the storage segment 312, copying the valid digests (including the original digests 212($p$−1), 212($p$)) to a next unoccupied (or available) segment (not shown) among the storage segments 304, and erasing at least the original digests 212($p$−1), 210($p$), 210($p$+1) from the storage segment 312 to make its storage space available for reuse.

It is noted that the temporal order of the digests . . . 212($p$+7), 212($p$+8), 212($p$+1), (including the copied valid digests) in the storage segments 304 is maintained relative to the temporal order of the data blocks . . . 212($p$+7), 212($p$+8), 212($p$+1) . . . (including the copied valid data blocks) in the storage segments 302. It is further noted that information pertaining to one or more attributes of the copied valid digests (e.g., stream ID, LBA, data type) is managed and/or maintained in the log 214 relative to the time period during which the group of digests were copied, written, and/or generated.

By maintaining the digests of the data stream 206 as a group in the storage segments 304, while maintaining their temporal order relative to the data blocks of the data sub-stream 204 in the storage segments 302, the size of the deduplication domain of the data sub-stream 204 can be reduced, allowing the deduplication logic 120 to perform its deduplication activities with increased efficiency. Such efficiencies can likewise be achieved while performing deduplication activities involving the data blocks of the data sub-stream 208 and the digests of the data stream 210, due to the reduced size of the deduplication domain of the data sub-stream 208. Moreover, improved temporal and/or spatial localities of data blocks in a data sub-stream can allow for the possibility of a reduced deduplication index footprint. In certain embodiments, rather than maintaining each digest of the respective data streams 206, 210 in the storage segments 304, 308, respectively, a predetermined sampling of the total number of digests can be maintained in the respective storage segments 304, 308 to further increase deduplication efficiencies. Once a matching digest among the predetermined sampling of digests is identified, the deduplication logic 120 can then access a fuller or full set of the digests to complete its deduplication activities.

Figure 4:
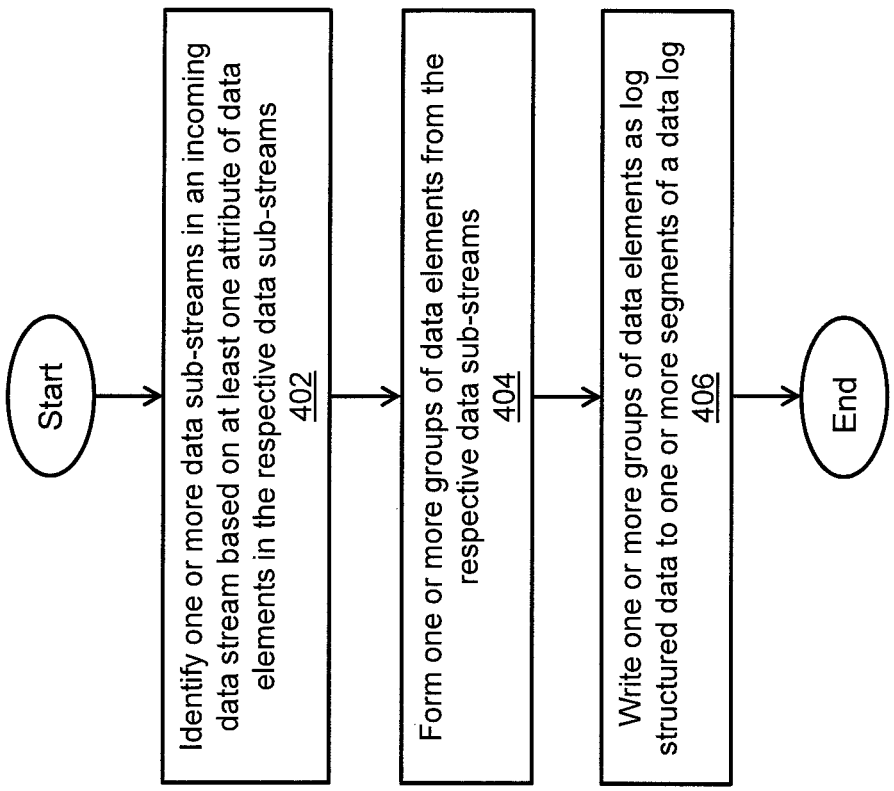
FIG. 4 is a flow diagram of an exemplary method of handling multiple sub-streams in an incoming stream of data in a stream-aware data storage system.

An exemplary method of handling multiple data streams in stream-aware data storage systems is described below with reference to FIG. 4. As depicted in block 402, one or more data sub-streams are identified in an incoming data stream based on at least one attribute of data elements in the respective data sub-streams. As depicted in block 404, one or more groups of data elements are formed from the respective data sub-streams. As depicted in block 406, one or more groups of data elements are written as log structured data to one or more segments of a data log.

Several definitions of terms are provided below for the sole purpose of aiding understanding of the foregoing description, as well as the claims set forth hereinbelow.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may also refer to a storage array including multiple storage devices. Such a storage device may refer to any non-volatile memory (NVM) device, including hard disk drives (HDDs), solid state drivers (SSDs), flash devices (e.g., NAND flash devices, NOR flash devices), and similar devices that may be accessed locally and/or remotely (e.g., via a storage attached network (SAN)). A storage array (or disk array) may refer to a data storage system used for block-based, file-based, or object storage, in which storage arrays can include, for example, dedicated storage hardware containing spinning hard disk drives (HDDs), solid state disk drives, and/or all-flash drives. A data storage entity may be any one or more of a file system, object storage, a virtualized device, a logical unit (LU), a logical unit number (LUN), a logical volume, a logical device, a physical device, and/or a storage medium. A logical unit (LU) may be a logical entity provided by a storage system for accessing data from the storage system. A logical unit (LU) is used interchangeably with a logical volume. A LU or LUN may be used interchangeably with each other. A LUN may be a logical unit number for identifying a logical unit, and may also refer to one or more virtual disks or virtual LUNs, which may correspond to one or more virtual machines. A physical storage unit may be a physical entity, such as a disk or an array of disks, for storing data in storage locations that can be accessed by address, in which a physical storage unit is used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and other types and/or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "JO request" or simply "JO" may be used to refer to an input or output request, such as a data read request or a data write request.

As employed herein, the term "defragmentation" refers to a process performed by a computer to reduce fragmentation by combining portions of data blocks, data files, or portions of other types of data storage units stored across non-contiguous areas of memory. Such combining of portions of data storage units makes subsequent access to the respective types of data storage units more efficient, and makes the resulting freed storage space available for reuse.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of handling multiple data streams in a stream-aware data storage system, comprising:
    identifying one or more data sub-streams in an incoming data stream based on at least one attribute of data elements in the respective data sub-streams;
    forming one or more groups of data elements from the respective data sub-streams;
    writing the one or more groups of data elements as log structured data to one or more segments of a data log; and
    maintaining, in persistent data storage, information pertaining to the at least one attribute of the data elements in the respective data sub-streams relative to time periods during which the respective groups of data elements were written.

2. The method of claim 1 wherein the identifying of one or more data sub-streams in the incoming data stream is based on one or more of a temporal locality of the data elements, a spatial locality of the data elements, a type of each data element, and a port number through which each data element is received.

3. The method of claim 1 further comprising:
    associating a stream identifier (ID) to each data element in each data sub-stream.

4. The method of claim 3 wherein the writing of the one or more groups of data elements as log structured data to one or more segments of the data log includes writing each group of data elements having the same stream ID to the same segment of the data log.

5. The method of claim 1 further comprising:
    generating a digest for each data element in each respective data sub-stream,
    thereby generating a plurality of digests for a plurality of data elements, respectively, in the respective data sub-stream.

6. The method of claim 5 further comprising:
    forming a group of digests from the plurality of digests; and
    associating a stream identifier (ID) to each digest in the group of digests.

7. The method of claim 6 further comprising:
    writing the group of digests as a data stream of log structured data to a segment of the data log.

8. The method of claim 7 further comprising:
    maintaining, in persistent data storage, information pertaining to (i) the at least one attribute of the data elements in the respective data sub-stream, and (ii) the respective digests in the data stream, relative to a time period during which each of a respective group of data elements from the respective data sub-stream and the group of digests from the data stream were written to the data log.

9. A data storage system, comprising:

a memory; and processing circuitry configured to execute program instructions out of the memory to:

identify one or more data sub-streams in an incoming data stream based on at least one attribute of data elements in the respective data sub-streams;

form one or more groups of data elements from the respective data sub-streams;

write the one or more groups of data elements as log structured data to one or more segments of a data log; and maintain, in persistent data storage, information pertaining to the at least one attribute of the data elements in the respective data sub-streams relative to time periods during which the respective groups of data elements were written.

10. The data storage system of claim 9 wherein the processing circuitry is further configured to execute the program instructions out of the memory to identify one or more data sub-streams in the incoming data stream based on one or more of a temporal locality of the data elements, a spatial locality of the data elements, a type of each data element, and a port number through which each data element is received.

11. The data storage system of claim 9 wherein the processing circuitry is further configured to execute the program instructions out of the memory to associate a stream identifier (ID) to each data element in each data sub-stream.

12. The data storage system of claim 11 wherein the processing circuitry is further configured to execute the program instructions out of the memory to write each group of data elements having the same stream ID to the same segment of the data log.

13. The data storage system of claim 9 wherein the processing circuitry is further configured to execute the program instructions out of the memory to:

generate a digest for each data element in each respective data sub-stream, thereby generating a plurality of digests for a plurality of data elements, respectively, in the respective data sub-stream.

14. The data storage system of claim 13 wherein the processing circuitry is further configured to execute the program instructions out of the memory to:

form a group of digests from the plurality of digests; and associate a stream identifier (ID) to each digest in the group of digests.

15. The data storage system of claim 14 wherein the processing circuitry is further configured to execute the program instructions out of the memory to write the group of digests as a data stream of log structured data to a segment of the data log.

16. The data storage system of claim 15 wherein the processing circuitry is further configured to execute the program instructions out of the memory to maintain, in persistent data storage, information pertaining to (i) the at least one attribute of the data elements in the respective data sub-stream, and (ii) the respective digests in the data stream, relative to a time period during which each of a respective group of data elements from the respective data sub-stream and the group of digests from the data stream were written to the data log.

17. A computer program product including a set of non-transitory, computer-readable media having instructions that, when executed by control circuitry of a computerized apparatus, cause the control circuitry to perform a method of handling multiple data streams in a stream-aware data storage system, the method comprising:

identifying one or more data sub-streams in an incoming data stream based on at least one attribute of data elements in the respective data sub-streams;

forming one or more groups of data elements from the respective data sub-streams;

writing the one or more groups of data elements as log structured data to one or more segments of a data log; and maintaining, in persistent data storage, information pertaining to the at least one attribute of the data elements in the respective data sub-streams relative to time periods during which the respective groups of data elements were written.

18. The computer program product of claim 17 wherein the method further comprises:

generating a digest for each data element in each respective data sub-stream, thereby generating a plurality of digests for a plurality of data elements, respectively, in the respective data sub-stream;

forming a group of digests from the plurality of digests;

associating a stream identifier (ID) to each digest in the group of digests; and writing the group of digests as a data stream of log structured data to a segment of the data log.

* * * * *